US008833835B2

(12) United States Patent
Nellen et al.

(10) Patent No.: US 8,833,835 B2
(45) Date of Patent: Sep. 16, 2014

(54) SHADING ASSEMBLY AND OPEN ROOF CONSTRUCTION PROVIDED THEREWITH

(75) Inventors: Marcel Johan Christiaan Nellen, Merselo (NL); Peter Christiaan Leonardus Johannes Manders, Horst (NL); Stephan Christiaan Vervoort, Boxmeer (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 13/426,199

(22) Filed: Mar. 21, 2012

(65) Prior Publication Data

US 2013/0106143 A1    May 2, 2013

(30) Foreign Application Priority Data

Mar. 24, 2011   (EP) .................................... 11159516

(51) Int. Cl.
*B60J 3/02*     (2006.01)
*B60J 7/00*     (2006.01)
*B60J 11/08*    (2006.01)

(52) U.S. Cl.
CPC ................................. *B60J 7/0023* (2013.01)
USPC ......................................................... 296/97.8

(58) Field of Classification Search
USPC ........................................ 296/214, 97.1, 97.8
See application file for complete search history.

(56) References Cited

FOREIGN PATENT DOCUMENTS

| DE | 102004041385 | 3/2005 |
| EP | 1852289 | 11/2007 |
| JP | 7144538 | 6/1995 |

OTHER PUBLICATIONS

European Search Report of the European Patent Office Patent Office in counterpart foreign application EP No. 11159516.1 filed Mar. 24, 2011.

*Primary Examiner* — Glenn Dayoan
*Assistant Examiner* — Melissa A Black
(74) *Attorney, Agent, or Firm* — Steven M. Koehler; Westman, Champlin & Koehler, PA

(57) ABSTRACT

A shading assembly for shading an opening with at least two opposite opening sides in a structure comprises a flexible shading member which is movable between a position completely covering said opening and a position at least partially freeing said opening. Said flexible shading member is defined by two shading member parts which each have a first edge connected to one of said opposite opening sides and an opposite second edge, wherein said second edges of both shading member parts together define an elongate releasable connection device of the type further comprising a movable operating member which upon movement along said second edges connects or disconnects said second edges.

29 Claims, 6 Drawing Sheets

SHADING ASSEMBLY AND OPEN ROOF CONSTRUCTION PROVIDED THEREWITH

BACKGROUND

The discussion below is merely provided for general background information and is not intended to be used as an aid in determining the scope of the claimed subject matter.

Aspects of the invention firstly relate to a shading assembly for shading an opening with at least two opposite opening sides in a structure, comprising a flexible shading member which is movable between a position completely covering said opening and a position at least partially freeing said opening.

A known shading assembly of such a type (also referred to as rollo) comprises a winding tube which is rotatably mounted in stationary mounts and onto which or from which the flexible shading member is wound. In such a type of shading assembly the two opposite opening sides of the opening are provided with guides embodied to guide longitudinal side edges of the shading member.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A shading assembly includes a flexible shading member which is defined by two shading member parts which each have a first edge connected to one of opposite opening sides and an opposite second edge. The second edges of both shading member parts together define an elongate releasable connection device of a type further comprising a movable operating member which upon movement along said second edges connects or disconnects said second edges. The opposite opening sides are provided with storage devices extending along the entire length of said opening sides for progressively receiving and housing the shading member parts when the operating member moves in a direction for disconnecting said second edges, and for progressively dispensing the shading member parts when the operating member moves in a direction for connecting said second edges. Each storage device is provided with a pressure member movable along said storage device for progressively pressing a respective one of the shading member parts into said storage device when the operating member moves in a direction for disconnecting said second edges. The pressure members are connected to the operating member in a manner to be moved thereby.

The shading assembly does not comprise a winding tube. The shading member now is a two-part shading member with two shading member parts which will be detached from each other at the second edges and which will move apart and (by virtue of the pressure members) will move into the respective storage devices when the shading member (by an appropriate movement of the operating member in a first direction) is moved towards the position freeing the opening, and which at least partly will move out of said storage devices towards each other to be connected again at said second edges when the shading member (by an appropriate opposite movement of the operating member) is moved towards the position covering the opening.

It is noted that the opening can have a shape with parallel opening sides (for example a rectangular shape) but it is conceivable too that the opening is differently shaped (e.g. circular, oval or triangular).

In one embodiment of the shading assembly, the elongate releasable connection device is of a zipper type and the movable operating member defines a zipper slider. As an alternative, the elongate releasable connection device is of a bag slide closure type and the movable operating member defines a bag slide closure slider. It should be noted however that it is conceivable too to provide other types of elongate releasable connection devices to be implemented in embodiments of the present invention.

In another embodiment, each pressure member is connected to the operating member by a rod capable of transmitting tensile forces and pressure forces, wherein each rod has two opposite ends pivotably connected to the operating member and respective pressure member, respectively, and wherein each rod has a variable length. Such a rod (or similar elongate member) will cause the pressure member to move when the operating member is operated, such that the pressure member then automatically will operate according to its envisaged function (specifically progressively pushing the shading member parts into the respective storage devices) without the need for separate driving devices. The rod (and thus the pressure members and operating member relative to each other) are able to assume a position which is most favorable for opening or closing the shading member. The variable length also will be of advantage when the opening does not have parallel opening sides.

It is possible that at least one of the rod, pressure member and operating member comprises a limiting device for limiting the pivot motion of the rods between a straight position in which both rods extend substantially perpendicularly to the direction of movement of the operating member and in which both pressure members and operating member substantially are positioned in line with each other, and an inclined position in which the rods are inclined such that, as seen in a direction in which the operating member will move for disconnecting said second edges of the shading member parts, the operating member is positioned ahead of the pressure members. The so-called straight position will be reached when the operating member is moved to the position in which the shading member is completely covering the opening. In this position, the rods assume a position with minimal length. The inclined position occurs at least when the operating member moves in the opposite direction. The rods then will assume a position with maximum length.

In one embodiment, each rod comprises at least two rod parts received one in the other in a telescoping manner for varying its length. But also other devices are conceivable for varying the length of the rods (such as for example when the rods are articulated).

It is possible too that the pressure members and the operating member are interconnected in a fixed position relative to each other.

In another embodiment of the shading assembly, it is further provided with covering members for at least partially covering the pressure members and operating member in the position of the flexible shading member completely covering the opening and in the position of the flexible shading member freeing said opening. Such covering members also will cover the sections of the shading member parts adjacent the pressure members and operating member, thus offering the assembly a neat appearance.

It is possible, then, that the covering members comprise two plate shaped, for example rectangular or triangular, members.

In a further embodiment, one of said plate shaped members which is intended to cover the pressure members and operating member in the position of the flexible shading member completely covering the opening has a fixed position, whereas the other plate shaped member moves along with the pressure members and operating member. Both plate shaped members may have a complementary shape such that both plate shaped members may be positioned close to each other in the open position of the shading assembly.

When, in accordance with yet another embodiment of the shading assembly, the storage devices and pressure members are provided with cooperating guide projections and recesses for defining the relative movement between a storage device and respective pressure member, the relative position between those parts which is required for pushing the shading member parts into the storage devices will be maintained automatically.

Further it is possible that each storage device comprises a profiled member with a substantially U-shaped cross section defined by two legs connected by a bottom, wherein said two legs define an open side facing the opposite storage device, and wherein flexible retention devices are provided for closing said open side. The flexible retention devices allow the introduction of the shading member parts into and the removal from the cavity defined within the profiled members, while still being able to maintain the shading member parts within said cavity without the need for additional means.

It is possible that the flexible retention devices comprise an array of flexible brush hairs extending from at least one leg towards the opposite leg along substantially the entire length of the profiled member, but as an alternative the flexible retention devices may comprise a flexible lip extending from at least one leg towards the opposite leg along substantially the entire length of the profiled member.

In yet another embodiment the flexible retention devices comprise a flexible strip which has a first end connected to a pressure member for movement along therewith. When the pressure member moves for pushing a shading member part into a profiled member, the flexible strip automatically follows the pressure member and closes the open side of the profiled member behind the pressure member for keeping the shading member part in the profiled member.

It is possible that the flexible strip has an opposite second end which is windable onto or from a winding mechanism or that the flexible strip has an opposite second end which is guided around a reversal roller and back into the profiled member (for example into a channel defined therein below/adjacent the bottom).

When, indeed, such a profiled member is provided as a storage device, the first edge of a shading member part could be connected to the bottom of said respective profiled member.

It is to be expected that in most embodiments of the shading assembly the elongate releasable connection device defined by said second edges of the shading member parts will extend along a straight line. As a result, a symmetrical structure is obtained which also from an aesthetical point of view may be an advantage. It should be noted, however, that the above does not preclude the possibility that the elongate releasable connection device defined by said second edges of the shading member parts will extend along a curved line.

In a basic embodiment of the shading assembly, the operating member and pressure members are devised to be moved manually. However, in a more sophisticated embodiment it is possible too that the shading assembly further comprises a drive member for moving the operating member and pressure members.

For example the drive member may engage the operating member and/or pressure member and may comprise one of a drive cable driven by a motor (e.g. an electric motor), a cylinder-piston assembly, a telescopic arm and a linkage arrangement.

In a specific embodiment of the shading assembly, the structure is an open roof structure for a vehicle, the opening is a roof opening provided in a stationary roof part of said vehicle and the flexible shading member is a flexible sun screen.

In a second aspect, the present invention relates to an open roof construction for a vehicle, comprising a roof opening in a stationary roof part of said vehicle and a sun screen assembly cooperating with said roof opening, which sun screen assembly comprises a shading assembly having one or more features herein described.

BRIEF DESCRIPTION OF THE DRAWINGS

Hereinafter aspects of the invention will be elucidated while referring to the drawings, in which.

DETAILED DESCRIPTION OF THE ILLUSTRATIVE EMBODIMENTS

Figure 1:
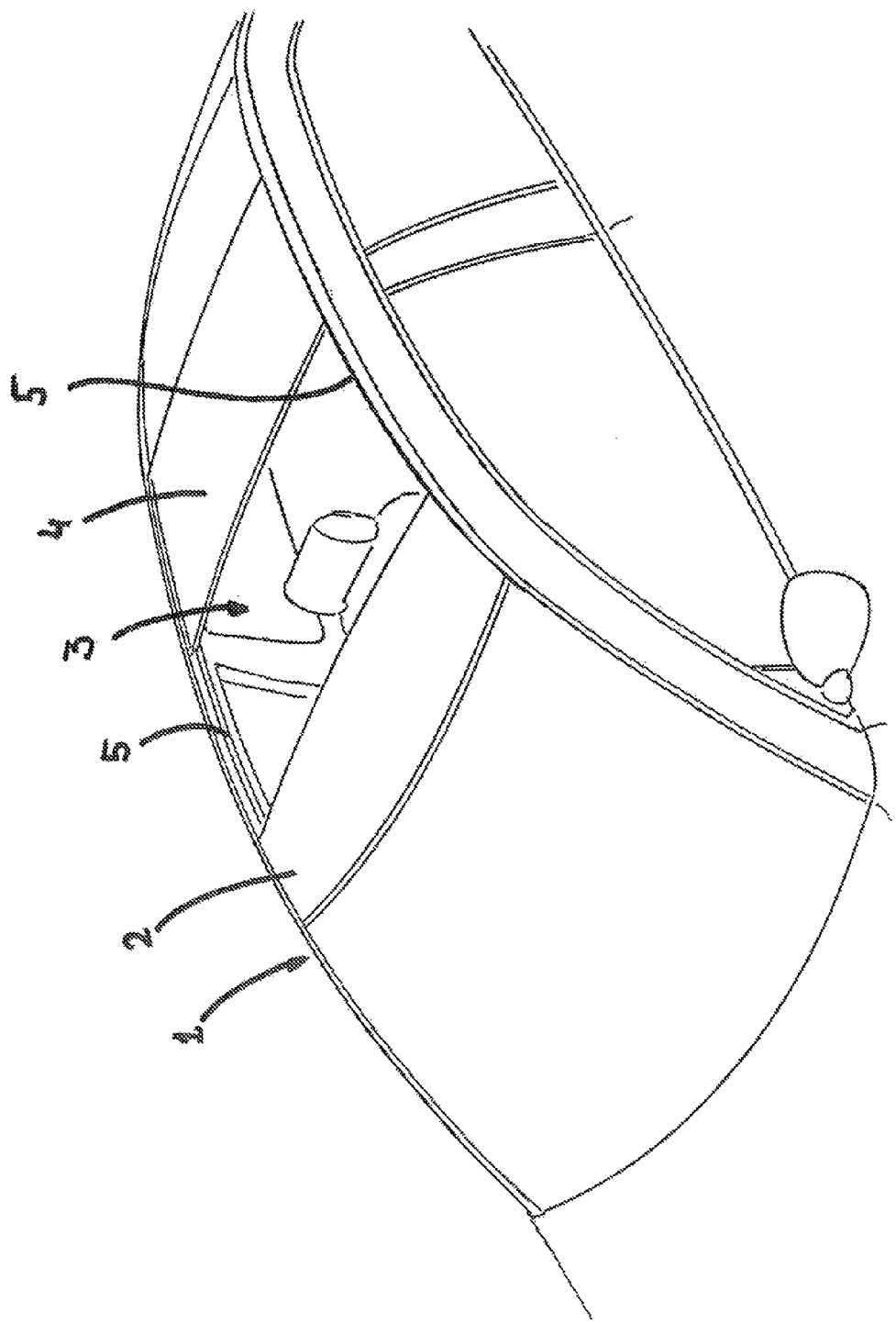
FIG. 1 illustrates a vehicle comprising an open roof construction.

Referring to FIG. 1 part of a vehicle 1 is illustrated, comprising a stationary roof part 2 and a roof opening 3 provided in said stationary roof part 2. The roof opening 3 may be closed and opened by a movable panel 4, as is known per se. In the illustrated embodiment, the roof opening 3 is rectangular and comprises two opposite parallel longitudinal side edges 5. It should be noted however that the roof opening 3 may have other shapes too, such as for example oval, circular or triangular.

A sun screen assembly cooperating with said roof opening 3 and comprising a shading assembly has not been illustrated in FIG. 1 but will be elucidated while referring to the remaining figures.

Figure 2:
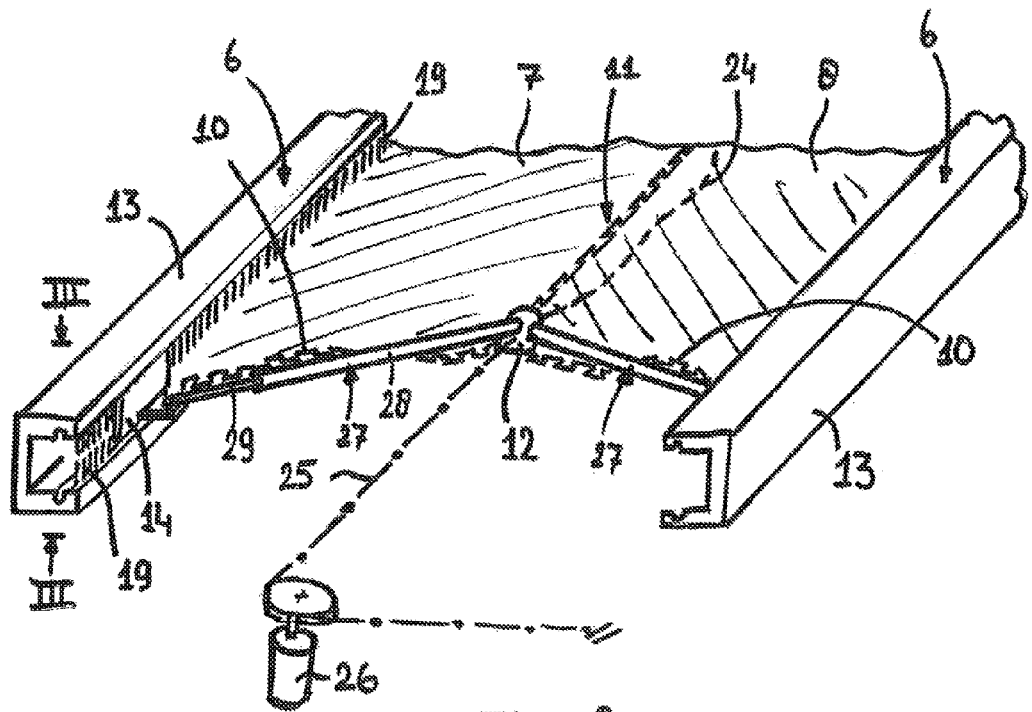
FIG. 2 illustrates part of an embodiment of a shading assembly for use in the open roof construction according to FIG. 1.

Thus FIG. 2 schematically and in a perspective view illustrates part of a shading assembly for shading the substantially rectangular roof opening 3. Generally such a shading assembly will be located at a level below the movable panel 4 such as not to interfere with the movement thereof and will comprise two opposite parallel opening sides 6 which may be similar to, be part of or be positioned close to the side edges 5 of the roof opening 3. The shading assembly comprises a flexible shading member (or flexible sun screen) which is movable between a position completely covering said opening 3 and a position freeing said opening 3 at least in part. The flexible shading member may comprise different kinds of cloth (for example transparent or not, different colours, thick or thin, etcetera)

The flexible shading member is defined by two shading member parts 7 and 8 which each have a first edge 9 (best seen in FIG. 3) connected to one of said opposite parallel opening sides 6 and an opposite second edge 10, wherein said second edges 10 of both shading member parts 7,8 together define an elongate releasable connection device 11 of the type further comprising a movable operating member 12 which upon movement along said second edges 10 connects or disconnects said second edges 10.

The elongate releasable connection device 11 may be of the zipper type in which the movable operating member 12 defines a zipper slider. As an alternative, the elongate releasable connection device 11 may be of the bag slide closure type in which the movable operating member 12 defines a bag slide closure slider. It is noted, however, that also other continuous closures of a similar type may be applied.

As illustrated in FIG. 2 the elongate releasable connection device 11 defined by said second edges 10 of the shading member parts 7,8 extends along a straight line and centrally in parallel to said opposite opening sides 6 of the opening 3. As an alternative, however, it also could extend along a curved line, as indicated schematically by the chain line 24 and/or not centrally.

The operating member 12 may be devised to be moved manually as is commonly known for a zipper slider. However, it is possible too that a drive member is provided for moving the operating member 12, such as a drive cable 25 driven by a motor, e.g. an electric motor 26. Other drive members will be explained later while referring to FIGS. 10 and 11.

Figure 5:
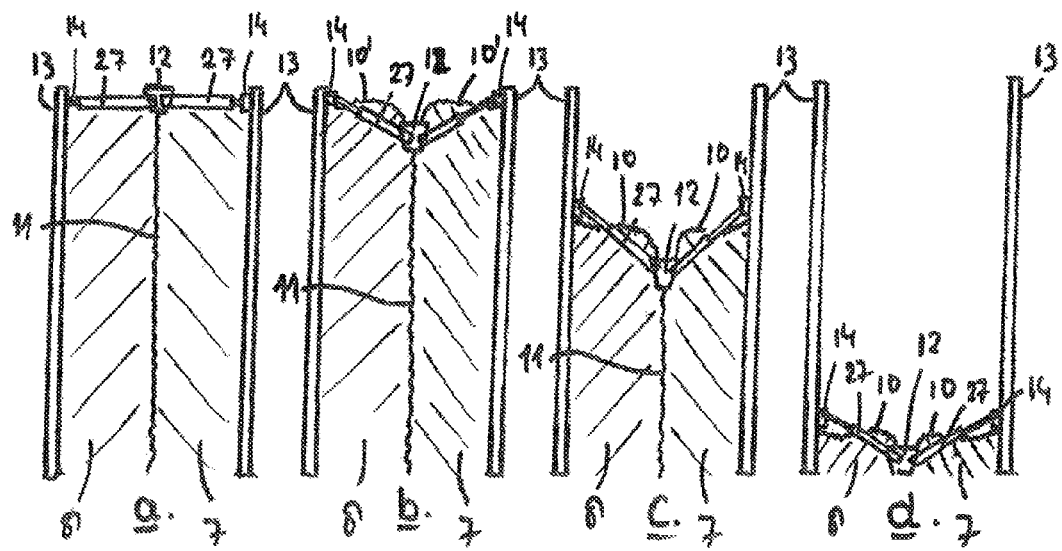
FIGS. 5a-d show four successive stages during the operation of a shading assembly.

The said opposite parallel opening sides 6 are provided with profiled members 13 which define part of storage devices extending along the entire length of said opening sides 6 for progressively receiving and housing the shading member parts 7,8 when the operating member 12 moves in a direction for disconnecting said second edges 10 of the shading member parts 7,8, and for progressively dispensing the shading member parts 7,8 when the operating member 12 moves in a direction for connecting said second edges 10, as will be illustrated more clearly below while referring to FIG. 5.

Each storage device further is provided with a pressure member 14 which is movable along a respective profiled member 13 for progressively pressing a respective one of the shading member parts 7,8 into said profiled member 13 when the operating member 12 moves in a direction for disconnecting said second edges 10. Said pressure members 14 are connected to the operating member 12 as to be moved thereby in a manner to be described later. Already here it is emphasized, however, that the phrase "to be moved thereby" does not necessarily mean that the pressure members 14 and operating member 12 always move synchronously. Further it is noted, that a drive member also may engage the pressure members 14 instead of the operating member 12.

Figure 3:
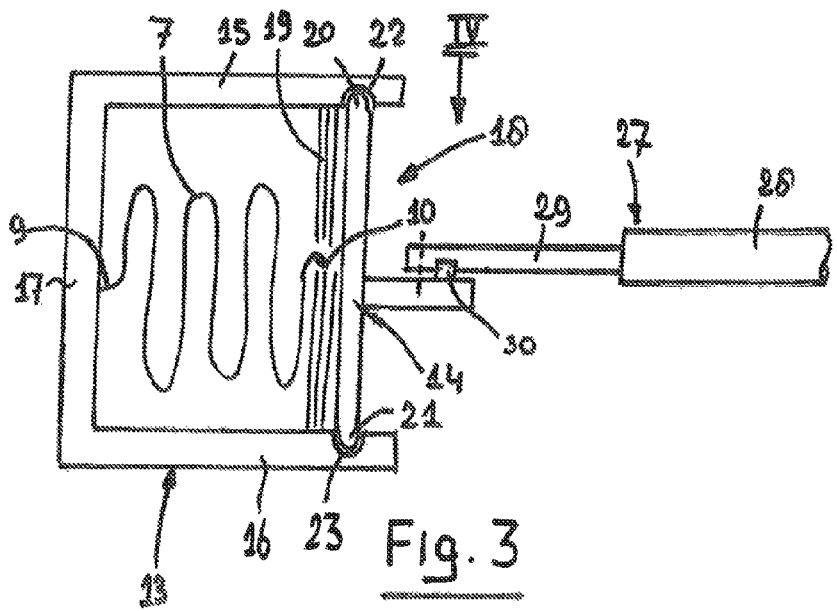
FIG. 3 on a larger scale illustrates a cross-section according to III-III in FIG. 2.

Referring to FIG. 3 a cross section of profiled member 13 according to III-III in FIG. 2 is illustrated. Said profiled member 13 has a substantially U-shaped cross section defined by two legs 15,16 connected by a bottom 17. The profiled member 13 is oriented such that two legs 15,16 define an open side 18 facing the opposite profiled member 13 (which is intended to receive the shading member part 8). FIG. 3 clearly shows that the first edge 9 of shading member part 7 is connected to the bottom 17 of the respective profiled member 13 (in any appropriate manner, such as for example by sealing, gluing or by mechanical connection means).

Each leg 15,16 of the profiled members 13 along substantially the entire length of said profiled members 13 supports an array of flexible brush hairs 19 extending towards the opposite leg. These brush hairs 19 define retention means creating a barrier or curtain which is sufficiently flexible to allow the passage of the respective shading member part 7,8 when introducing it into or removing it from the profiled member 13, and which meanwhile is sufficiently strong to prevent the undesired release of the shading member part 7,8 from said profiled member 13. Other types of retention means will be shown and described later while referring to FIGS. 6-9.

The profiled member 13 and pressure member 14 are provided with cooperating guide projections and recesses for defining the relative movement between both parts. In the embodiment illustrated in FIG. 3, the pressure member 14 comprises projecting upper and lower ends 20, 21 which are received in recesses 22, 23 provided in the legs 15 and 16 of the profiled member 13 for allowing the pressure member 14 to slide longitudinally along the profiled member 13.

Figure 4:
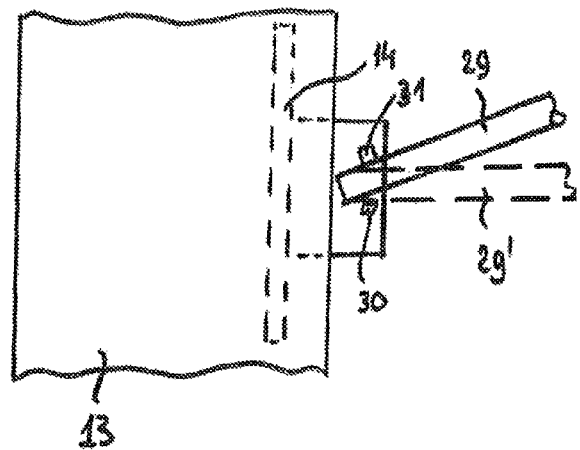
FIG. 4 shows a view according to IV in FIG. 3 of the connection between a rod and a pressure member.

Specifically referring to FIGS. 2-4 it is illustrated that each pressure member 14 is connected to the operating member 12 by a rod 27 capable of transmitting tensile forces and pressure forces. Each rod 27 has two opposite ends pivotably connected to the operating member 12 and respective pressure member 14, respectively. In the illustrated embodiment each rod 27 comprises two rod parts 28 and 29 received one in the other in a telescoping manner for varying the length of the rod 27. As will appear below, such a variation in length will occur automatically under influence of operating forces acting on each rod 27.

FIG. 4, which is a view according to IV in FIG. 3, illustrates that the pressure member 14 comprises limiting means or stops 30,31 for limiting the pivot motion of the rod 27 between a straight position (as illustrated in FIG. 4 in dotted lines by rod part 29' and as illustrated in FIG. 5a) in which both rods 27 extend substantially perpendicularly to the opposite parallel opening sides 6 (or profiled members 13) of the opening 3 and in which both pressure members 14 and operating member 12 substantially are positioned in line with each other, and an inclined position (as illustrated in FIG. 4 in full lines by rod part 29 and as illustrated in FIGS. 5b-d) in which the rods 27 are inclined such that, as seen in a direction in which the operating member 12 will move for disconnecting said second edges 10 of the shading member parts 7,8, the operating member 12 is positioned ahead of the pressure members 14. In both positions one of the stops 30,31 engages the rod part 29, but it will be clear that other equivalent limiting means may be applied. Thus it is conceivable too that the inclined position will be defined by the maximum amount in which the rods 27 are allowed to increase their length.

The operation of the shading assembly will be described while referring to FIG. 5. FIG. 5a shows the shading assembly in a position for completely covering or closing the roof opening 3. The rods 27 are in the straight, aligned position and the shading member parts 7,8 are connected at their second edges 10 over the entire length of the shading assembly. In this position the rods 27 have assumed their minimal length.

Upon opening the shading assembly the operating member 12 is moved (manually or driven by a drive member, see FIG. 2) in a direction downwardly as seen in FIG. 5b. During the first stage of this movement of the operating member 12 the pressure members 14 remain in their initial position while the rods 27 pivot and are increased in length. During this first stage parts of the second edges 10' are disconnected from each other to make the shading member parts 7,8 less taut there and to offer these the opportunity to be pushed into the profiled members 13 when the pressure members 14 will start to move along with the operating member 12. The pressure members 14 will start to move when the rods 27 have reached the inclined position with maximum inclination (pivot angle).

FIG. 5c shows a position in which the operating member 12 and pressure members 14 have moved a certain distance for partly opening the shading assembly. The parts of the shading assembly parts 7,8 behind (in FIG. 5c above) the pressure members 14 have been pushed through the open sides 18 (FIG. 3) into the internal cavity of the profiled members 13 by virtue of the pressure members 14 and are kept safe therein by the brush hairs 19 (see FIG. 3). It should be noted that the leading edge of the pressure members 14 could be shaped for engaging and guiding the shading member parts 7,8 in a most effective manner. Also other parts of the structure, such as for example the rods 27, could comprise guide provisions for enhancing the proper movement of said shading member parts into (and/or out of) the profiled members 13.

In FIG. 5d the operating member 12 and thus the pressure members 14 (almost) have reached their extreme positions for completely freeing or opening the roof opening 3.

For again closing the shading assembly, starting from the position illustrated in FIG. 5d, the operating member 12 is moved in the opposite direction. The pressure members 14 will move along with the operating member 12, partly due to forces transmitted by the rods 27 and partly because the shading member parts 7,8 are pulled out of the profiled members 13 and thus engage the leading edge of said pressure members 14 while generating a thrust in the direction of movement (upwardly as seen in FIG. 5c).

Upon again reaching the position illustrated in FIG. 5b the pressure members 14 will stop and a further movement of the operating member 12 towards its end position illustrated in FIG. 5a will pivot the rods 27 to the straight (and shortened) position of FIG. 5a in which the shading member parts 7,8 are completely taut and the shading assembly is entirely closed.

Figure 6:
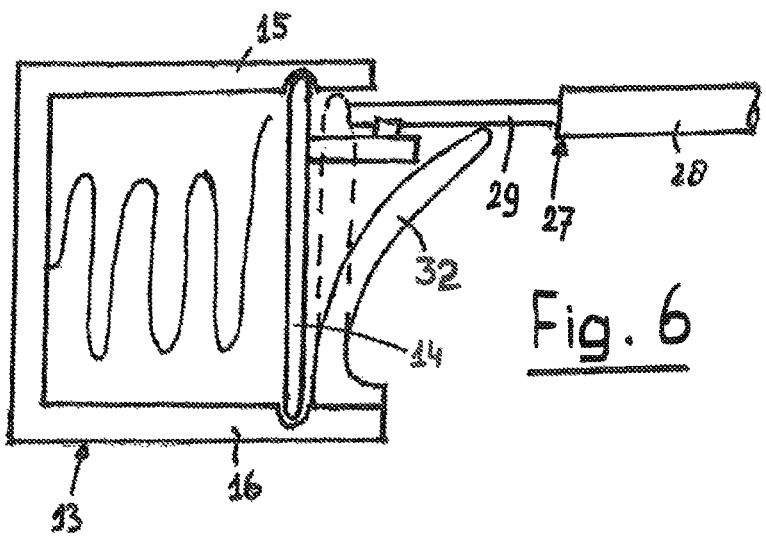
FIGS. 6 and 7 show alternative embodiments of the retention devices in a view corresponding to FIG. 3.
Figure 7:
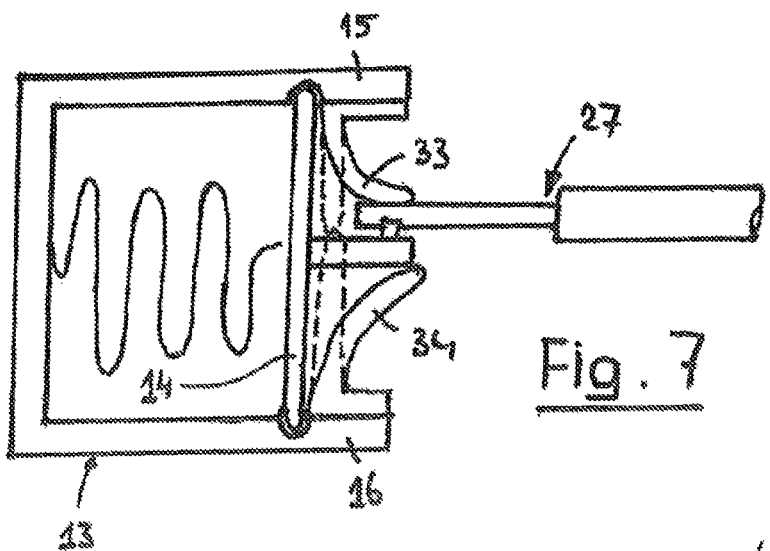

FIGS. 6 and 7 show alternative embodiments of the retention means, which in FIG. 6 comprise a single flexible lip 32 extending from the lower leg 15 upwards towards the upper leg 16. The rod 27, in this embodiment, is attached to the pressure member 14 at an elevated position compared to the embodiment illustrated in FIG. 3. In FIG. 7 two flexible lips 33 and 34 extending from the legs 15 and 16, respectively, are shown. In either embodiment the lips 32, 33 and 34 generally will extend along substantially the entire length of the profiled members 13.

Figure 8:
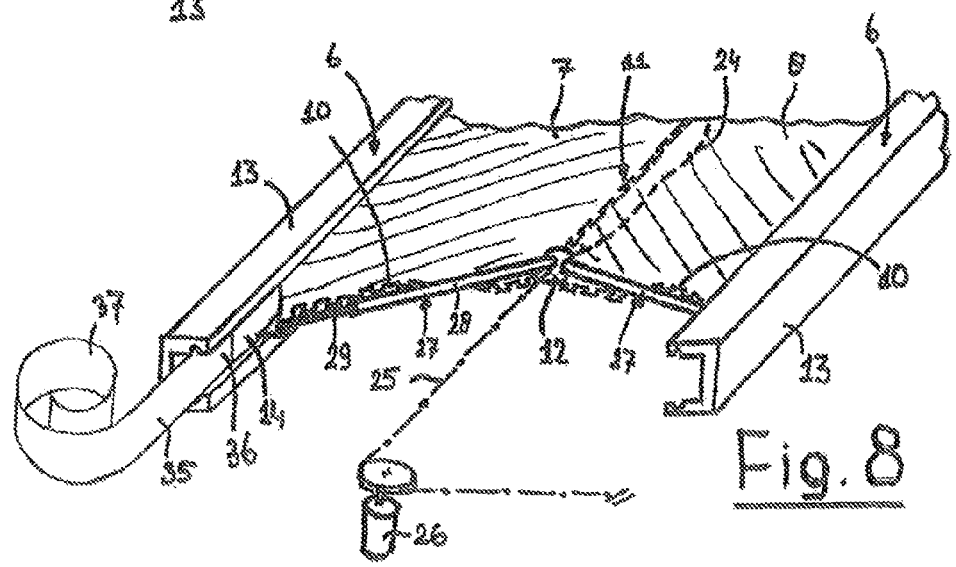
FIGS. 8 and 9 show alternative embodiments of the retention devices in a view corresponding to FIG. 2.

FIG. 8 shows an embodiment in which the flexible retention means comprise a flexible strip 35 which has a first end 36 connected to a pressure member 14 for movement along therewith. Said flexible strip 35 has an opposite second end 37 which may be windable onto or from a winding mechanism (for example a winding spool not illustrated).

Figure 9:
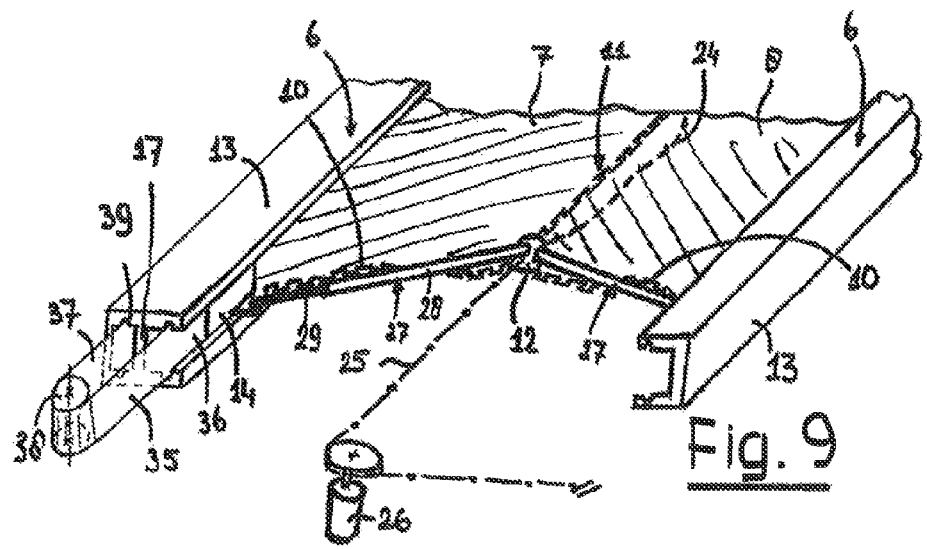

In the embodiment according to FIG. 9 the flexible strip 35 has an opposite second end 37 which is guided around a reversal roller 38 and back into the profiled member 13, for example into a guiding channel 39 thereof adjacent the bottom 17 (only represented for one profiled member 13 but also present at the other). Movement of the pressure member 14 moves the second strip end 37 in to and out of said guiding channel 39.

Figure 10:
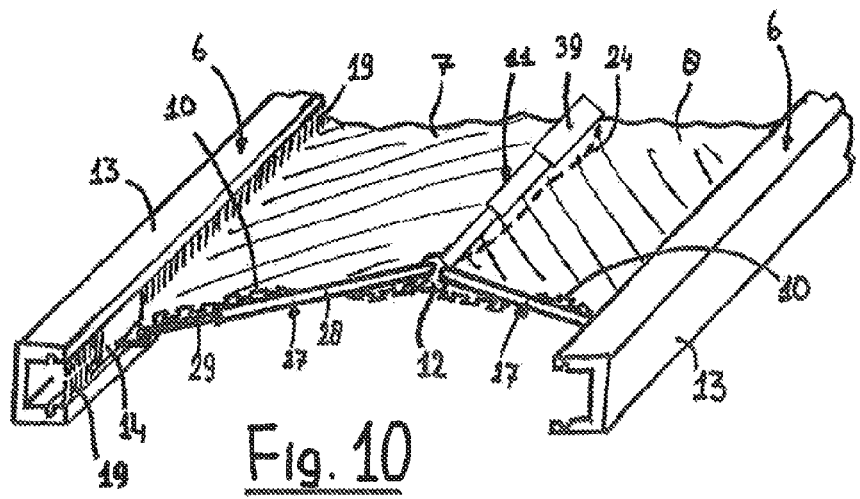
FIGS. 10 and 11 show alternative drive devices in a view corresponding to FIG. 2.
Figure 11:
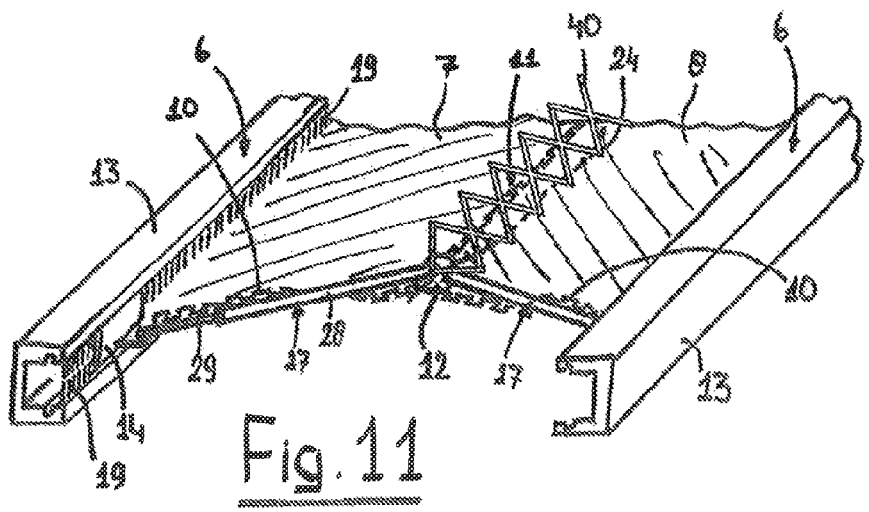

FIG. 10 shows an alternative for the drive member, which here is a telescopic arm (or cylinder-piston assembly) 39 engaging the operating member 12. In FIG. 11 a linkage arrangement 40 is provided engaging the operating member 12. In either embodiment the drive means also or alternatively could engage the pressure members 14.

Figure 12:
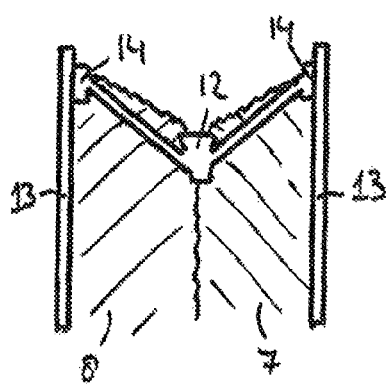
FIG. 12 shows part of another embodiment of the shading assembly.

Whereas the previous embodiments all use pivoting rods 27 connecting the pressure members 14 to the operating member 12, FIG. 12 shows an alternative embodiment in which the pressure members 14 and operating member 12 are integrated into a single piece and have a fixed position relative to each other. Of course this position may differ from the illustrated one (for example these parts may be positioned on a straight line).

Figure 13:
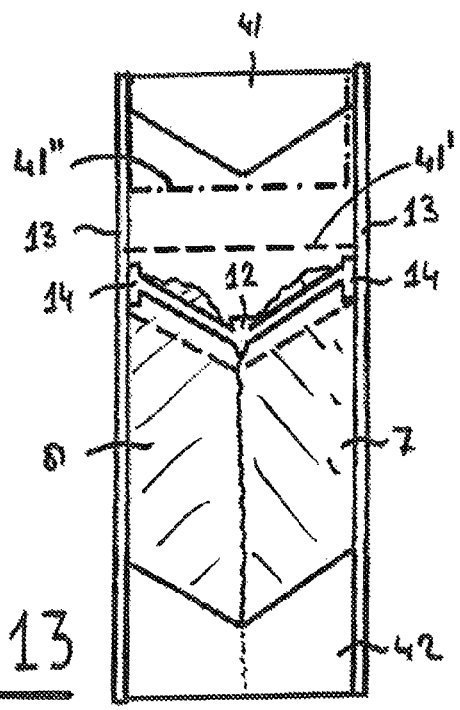
FIG. 13 shows yet another embodiment of the shading assembly.

Finally FIG. 13 shows plate shaped covering members 41 and 42. Covering member 41 is in a position for covering the pressure members 14 and operating member 12 (and corresponding free edges of the shading member parts 7 and 8) when the shading assembly closes the opening, and covering member 42 is in a position for covering the pressure members 14 and operating member 12 when the shading assembly is in an open position freeing the opening. Instead of a fixed covering member 41 a movable covering member (indicated by dotted lines) 41' moving along with the operating member 12 and pressure members 14 may be used. Further the covering members 41 and 42 as illustrated have a complementary triangular shape, but they also may have different shapes, complementary or not (illustrated for example by chain line 41" as rectangular).

The covering member 41 may be provided with guide provisions (not illustrated) for the shading member parts 7,8.

The invention is not limited to the embodiments described before which may be varied widely within the scope of the invention as defined by the appending claims. For example the rod parts 28 and 29 can be spring loaded towards a position for a maximum length of the rod 27.

Although the subject matter has been described in a language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

What is claimed is:

1. A shading assembly for shading an opening with at least two opposite opening sides in a structure comprising:
a flexible shading member which is movable between a position completely covering said opening and a position at least partially freeing said opening, the flexible shading member having two shading member parts which each have a first edge connected to one of said opposite opening sides and an opposite second edge, wherein said second edges of both shading member parts together define an elongate releasable connection device comprising a movable operating member which upon movement along said second edges connects or disconnects said second edges, wherein said opposite opening sides are provided with storage devices extending along the entire length of said opening sides configured to progressively receive and house the shading member parts including the second edges thereof when the operating member moves in a direction for disconnecting said second edges, and configured to progressively dispense the shading member parts when the operating member moves in a direction for connecting said second edges, and wherein each storage device is provided with a pressure member movable along said storage device configured to progressively press each shading member with the corresponding second edge into said storage device when the operating member moves in a direction for disconnecting said second edges, which pressure members are connected to the operating member in a manner to be moved thereby.

2. The shading assembly according to claim 1, wherein the elongate releasable connection device is of a zipper type and the movable operating member comprises a zipper slider.

3. The shading assembly according to claim 1, wherein the elongate releasable connection device is of the bag slide closure type and the movable operating member comprises a bag slide closure slider.

4. The shading assembly according to claim 1, wherein each pressure member is connected to the operating member by a rod configured to transmit tensile forces and pressure forces, wherein each rod has two opposite ends pivotably connected to the operating member and a respective pressure member, respectively, and wherein each rod has a variable length.

5. The shading assembly according to claim 4, wherein at least one of the rod, pressure member and operating member includes a limit device configured to limit pivot motion of the rods between a straight position in which both rods extend substantially perpendicularly to a direction of movement of the operating member and in which both pressure members and operating member substantially are positioned in line with each other, and an inclined position in which the rods are inclined such that, as seen in a direction in which the operating member will move for disconnecting said second edges of the shading member parts, the operating member is positioned ahead of the pressure members.

6. The shading assembly according to claim 4, wherein each rod comprises at least two rod parts coupled to each other in a telescoping manner to vary the length of the rod.

7. The shading assembly according to claim 1, wherein the pressure members and the operating member are interconnected in a fixed position relative to each other.

8. The shading assembly according to claim 1 and further comprising covering members to least partially cover the pressure members and operating member in the position of the flexible shading member completely covering the opening and in the position of the flexible shading member freeing said opening.

9. The shading assembly according to claim 8, wherein the covering members comprise first and second plate shaped members.

10. The shading assembly according to claim 9, wherein the first plate shaped member covers the pressure members and operating member in the position of the flexible shading member completely covering the opening and has a fixed position, whereas the second plate shaped member moves along with the pressure members and operating member.

11. The shading assembly according to claim 1, wherein the storage devices and pressure members are provided with cooperating guide projections and recesses to define the relative movement between a storage device and respective pressure member.

12. The shading assembly according to claim 1, wherein each storage device comprises a profiled member with a substantially U-shaped cross section having two legs connected by a bottom, wherein said two legs define an open side facing the opposite storage device, and wherein a flexible retention device is configured to close said open side.

13. The shading assembly according to claim 12, wherein the flexible retention device comprises an array of flexible brush hairs extending from at least one leg towards the opposite leg along substantially the entire length of the profiled member.

14. The shading assembly according to claim 12, wherein the flexible retention device comprises a flexible lip extending from at least one leg towards the opposite leg along substantially the entire length of the profiled member.

15. The shading assembly according to claim 12, wherein the flexible retention device comprises a flexible strip which has a first end connected to a pressure member for movement along therewith.

16. The shading assembly according to claim 15, wherein the flexible strip has an opposite second end which is windable onto or from a winding mechanism.

17. The shading assembly according to claim 15, wherein the flexible strip has an opposite second end which is guided around a reversal roller and back into the profiled member.

18. The shading assembly according to claim 12, wherein the first edge of a shading member part is connected to the bottom of a respective profiled member.

19. The shading assembly according to claim 1, wherein the elongate releasable connection device defined by said second edges of the shading member parts extends along a straight line.

20. The shading assembly according to claim 19, wherein the elongate releasable connection device defined by said second edges of the shading member parts extends along a curved line.

21. The shading assembly according to claim 1, wherein the operating member and pressure members are configured to be moved manually.

22. The shading assembly according to claim 1 and further comprising a drive member configured to move the operating member and pressure members.

23. The shading assembly according to claim 22, wherein the drive member engages the operating member and/or pressure member and comprises one of a drive cable driven by a motor, a cylinder-piston assembly, a telescopic arm and a linkage arrangement.

24. The shading assembly according to claim 1, wherein the structure is an open roof structure for a vehicle, the opening is a roof opening provided in a stationary roof part of said vehicle and the flexible shading member is a flexible sun screen.

25. An open roof construction for a vehicle, comprising a roof opening in a stationary roof part of said vehicle and a sun screen assembly cooperating with said roof opening having two opposite parallel longitudinal side edges, which sun screen assembly comprises a shading assembly for shading an opening with at least two opposite opening sides in a structure wherein the two opposite opening sides are spaced apart to provide said opening and positioned in the region of each of the longitudinal side edges, the shading assembly comprising:

a flexible shading member which is movable between a position completely covering said opening and a position at least partially freeing said opening, the flexible shading member having two shading member parts which each have a first edge connected to one of said opposite opening sides and an opposite second edge, wherein said second edges of both shading member parts together define an elongate releasable connection device comprising a movable operating member which upon movement along said second edges connects or disconnects said second edges, wherein said opposite opening sides are provided with storage devices extending along the entire length of said opening sides configured to progressively receive and house the shading member parts when the operating member moves in a direction substantially parallel to the two opposite opening sides and the parallel longitudinal side edges for disconnecting said second edges, and configured to progressively dispense the shading member parts when the operating member moves in a direction substantially parallel to the two opposite opening sides and the parallel longitudinal side edges for connecting said second edges, and wherein each storage device is provided with a pressure member movable along said storage device and configured to progressively press a respective one of the shading member parts into said storage device when the operating member moves in a direction for disconnecting said second edges, which pressure members are connected to the operating member in a manner to be moved thereby.

26. The open roof construction of a vehicle according to claim 25 and wherein the shading part members are progressively received in folds within the storage devices as the operating member moves in the direction for disconnecting said second edges.

27. The open roof construction of a vehicle according to claim 26 and wherein the shading part members are progressively extended from the folds within the storage device as the operating member moves in the direction for connecting said second edges.

28. The open roof construction of claim 25 wherein each opening side is positioned proximate one of the longitudinal side edges.

29. The open roof construction of claim 25 wherein each opening side is part of one of the longitudinal side edges.

\* \* \* \* \*